UNITED STATES PATENT OFFICE.

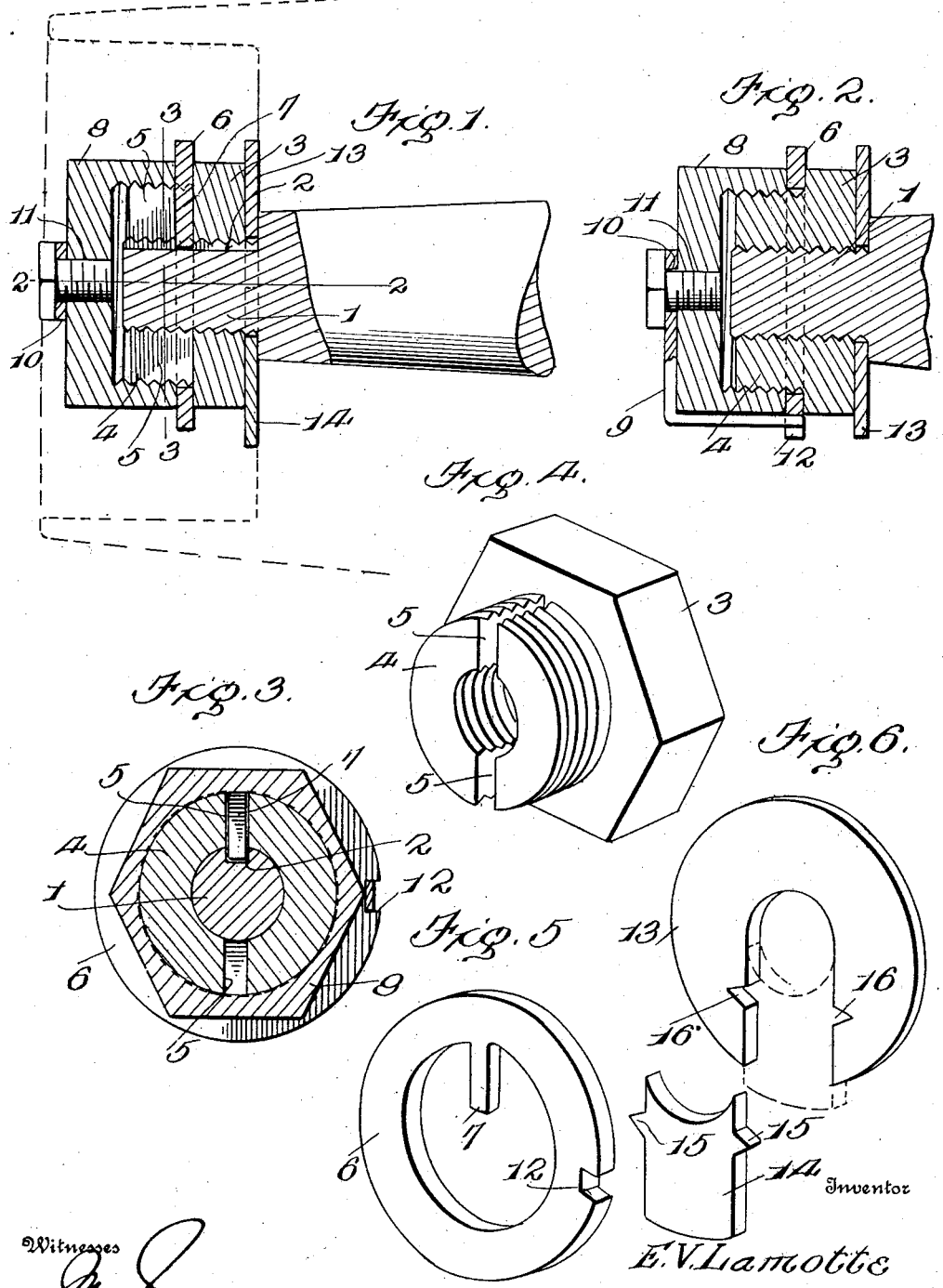

EDMUND V. LAMOTTE, OF PORTLAND, OREGON.

NUT-LOCK.

No. 919,034.     Specification of Letters Patent.     Patented April 20, 1909.

Application filed October 2, 1908. Serial No. 455,796.

*To all whom it may concern:*

Be it known that I, EDMUND V. LAMOTTE, citizen of the United States, residing at Portland, in the county of Multnomah and State of Oregon, have invented certain new and useful Improvements in Nut-Locks, of which the following is a specification.

This invention comprehends certain new and useful improvements in nut locks, and the object of the invention is an improved device of this character which embodies peculiar means for effectually maintaining the nut in the desired adjusted position against any loosening or tightening movement from vibration or the like, while at the same time rendering the nut susceptible of quick and convenient detachment when desired, without in anywise injuring any of the parts of the nut lock which would prevent its re-use, said nut lock being thus particularly adapted for use on automobiles or other vehicles in securing the wheels in position, although it is to be understood that it is not limited to any such use, but may be employed in connection with jarring machinery or rail joints or for any other purpose where an efficient device of this character is desired.

With this and other objects in view that will more fully appear as the description proceeds, the invention consists in certain constructions and arrangements of the parts that I shall hereinafter fully describe, and then point out the novel features thereof in the appended claims.

For a full understanding of the invention and the merits thereof, and to acquire a knowledge of the details of construction, reference is to be had to the following description and accompanying drawing, in which:

Figure 1 is a longitudinal sectional view showing my improved nut lock applied to an axle to retain the wheel thereon, the hub of the wheel being indicated in dotted lines; Fig. 2 is a longitudinal section on the line 2—2 of Fig. 1; Fig. 3 is a transverse section on the line 3—3 of Fig. 1; Figs. 4, 5 and 6 are detail views in perspective of the main nut, the keeper and the washer respectively.

Corresponding and like parts are referred to in the following description and indicated in all the views of the drawing by the same reference characters.

Referring to the drawing, the numeral 1 designates a threaded element such as an axle end or bolt which is formed with a longitudinal groove or keyway 2 and upon which works a main nut 3 that may be of any desired or approved construction or design, except that it is formed at its outer face with a reduced portion constituting an exteriorly threaded annular boss 4. This boss 4 is formed with radially extending slots 5 that lead from the outer end thereof, as shown, and that extend from the inner to the outer surfaces of the boss and are adapted in sundry positions of the main nut for registry with the longitudinal groove 2, it being observed that in the present instance only two of these slots are employed so as not to weaken the boss, but it is to be understood that any desired number may be employed, according to the accuracy of adjustment which it is desired to effect with the main nut.

Acting in conjunction with the slots 5 and the keyway 2 is a keeper 6 which is preferably in the form of an annulus that loosely encircles the boss 4 and that is formed with a radially and inwardly disposed key 7 which is designed to be received in the selected slot with its extremity terminating in the keyway 2, thereby obviously securing the nut rigidly in position upon the threaded element. This keeper 6 is secured in an operative position by means of a cap nut 8 that is engaged with the threads of the boss 4 and bears against the keeper to hold the same interposed between the main and cap nuts, the keeper being of such a size as to project outwardly beyond the peripheries of both nuts for a purpose to be hereinafter disclosed. With this construction, it will be manifest that as long as the key 7 is retained in position in the slot and keyway, or in other words, as long as the keeper is sustained in operative position by the cap nut, the main nut will be held securely against any loosening or tightening movement, and it is therefore advisable to prevent possible loosening of the cap nut during vibration or the like. As one means for accomplishing this purpose, I provide a spring tongue or detent 9 that is formed at one end with an eye 10 through which passes a screw or other suitable fastening means 11 that rigidly attaches the detent to the outer face of the cap nut, as shown. The other end of the spring tongue is then bent so as to bear against one of the faces on the periphery of the cap nut, and the extremity of the detent is designed to be seated in a notch 12 formed in the projecting portion of the keeper 6, as shown, thereby manifestly locking the cap nut to the keeper, and thus preventing any movement of the former relative to the latter. It is to be of course observed that any number of notches 12 may be employed, according as desired.

In addition to its function of retaining the keeper 6 in position, it will be seen that the cap nut incloses the operative parts of the nut lock so as to protect the same from the detrimental effects of moisture or dirt or the like.

In effecting the accurate adjustment of the main nut 3, I preferably employ one or more washers 13 which are interposed between the same and the work, and which may be of different thicknesses, according as desired, and of the usual or any approved construction or design, although in the present instance they are formed with detachable sections 14 that may be conveniently removed to permit the washer to be placed in position without the necessity of removing the main nut and its securing means from the threaded element, the sections being then returned to position to prevent the accidental disconnection of the washers. The detachable sections 14 are formed with lugs 15 which are received in recesses 16 so as to hold the detachable sections against any lateral movement and rendering it necessary to move the said sections longitudinally the thickness of the washer in order to effect detachment, while at the same time, when the sections are in use insuring them against accidental removal and permitting them to be held securely in position by the main nut as it is screwed up thereagainst.

In the practical use of my improved nut lock, when it is desired to remove the main nut 3 from the threaded element 1, the spring tongue or detent 9 is bent out of engagement with the notch 12, and this obviously releases the cap nut 8 and permits it to be disconnected from the threaded boss 4, whereby the keeper 6 may be readily slipped forwardly out of engagement with the slot 5 and the keyway 2 and thus unlocks the main nut and renders it susceptible of being turned upon the threaded element to effect its disconnection therefrom. When it is desired to return the main nut to position, it is only necessary to reverse the above operation.

From the foregoing description, in connection with the accompanying drawing, it will be apparent that I have provided an improved nut lock which is most efficient in operation and may be advantageously employed upon automobiles or other vehicles, jarring machinery or rail joints or the like, which is simple and durable in construction and consists of comparatively few parts that may be conveniently assembled, and which may be easily and cheaply manufactured so as to be placed upon the market at a price not too great to prevent its general adoption.

Having thus described the invention, what I claim is:

1. In a nut lock, the combination of a threaded element formed with a longitudinal groove or keyway, a nut working upon the threaded element and formed with a boss having a slot adapted for registry with the keyway, a keeper comprising an annulus encircling the boss and carrying a key engaged in the slot and keyway, and means for retaining the keeper in operative position.

2. In a nut lock, the combination of a threaded element formed with a longitudinal groove or keyway, a nut working upon the threaded element and formed with a boss having a slot adapted for registry with the keyway, a keeper comprising an annulus encircling the boss and carrying an inwardly disposed key engaged in the registering slot and the keyway, and means mounted upon the boss for retaining the keeper in operative position.

3. In a nut lock, the combination of a threaded element formed with a longitudinal groove or keyway, a main nut working upon the threaded element and formed with an exteriorly threaded annular boss having a slot adapted for registry with the keyway, said slot leading from the end of the boss and extending from the inner to the outer surface of the same, a keeper comprising an annulus loosely encircling the boss and a key rigid with the annulus and engaged in the slot and the keyway, and a second nut working upon the threaded boss and adapted to abut against the keeper to retain the same in position.

4. In a nut lock, the combination of a threaded element formed with a longitudinal groove or keyway, a main nut working upon the threaded element and formed with an exteriorly threaded boss having a slot adapted for registry with the keyway, a keeper mounted upon the boss and embodying a key engaged in the slot and the keyway, a second nut working upon the boss and adapted to sustain the keeper in operative position, and means carried by and rigid with the second nut and positively engaging the keeper to hold the former against any rotation relative to the latter or to the bolt.

5. In a nut lock, the combination of a threaded element formed with a longitudinal groove or keyway, a main nut working upon the threaded element and formed with an exteriorly threaded boss having a slot extending therethrough and adapted for registry with the keyway, a keeper loosely mounted upon the boss and embodying a key engaged in the slot and the keyway, a second nut working upon the threaded boss and adapted to sustain the keeper in operative position, and a spring tongue rigid with the second nut and having a detachable engagement with the keeper, as and for the purpose specified.

6. In a nut lock, the combination of a threaded element formed with a longitudinal groove or keyway, a main nut working upon the threaded element and formed with an exteriorly threaded annular boss having a slot extending therethrough and adapted for registry with the keyway, a keeper loosely mounted upon the boss and embodying a key engaged in the slot and the keyway, a second nut working upon the threaded boss and adapted to sustain the keeper in an operative position, the keeper projecting beyond the periphery of the second nut and being formed beyond the same with a notch, and a spring tongue secured to the second nut and bearing against the periphery thereof with its extremity seated in the notch, as and for the purpose specified.

In testimony whereof I affix my signature in presence of two witnesses.

EDMUND V. LAMOTTE. [L. S.]

Witnesses:
  M. M. Baum,
  L. F. Alderson.